US005992149A

United States Patent [19]

Hu

[11] Patent Number: 5,992,149

[45] Date of Patent: Nov. 30, 1999

[54] CONTROL UNIT FOR HAND-OPERATED HYDRAULIC JACK

[75] Inventor: Xuanzhe Hu, Zhuzhou Industrial College, Huobachong, Zhuzhou City 412008, Hunan Province, China

[73] Assignees: Shinn Hua (China) Machinery Co., Ltd., Guangdong Province; Xuanzhe Hu, Hunan Province, both of Switzerland

[21] Appl. No.: 08/894,067

[22] PCT Filed: Jan. 26, 1996

[86] PCT No.: PCT/CN96/00008

§ 371 Date: Oct. 1, 1997

§ 102(e) Date: Oct. 1, 1997

[87] PCT Pub. No.: WO96/22937

PCT Pub. Date: Aug. 1, 1996

[30] Foreign Application Priority Data

Jan. 28, 1995 [CN] China ................................ 95110630.9

[51] Int. Cl.[6] ................................ F16D 31/02

[52] U.S. Cl. ................................ 60/479; 60/482

[58] Field of Search ................................ 60/477, 479, 481, 60/482

[56] References Cited

U.S. PATENT DOCUMENTS

| | | | |
|---|---|---|---|
| 3,800,537 | 4/1974 | Denis | 60/477 |
| 3,806,091 | 4/1974 | Wride | 60/479 X |
| 4,823,588 | 4/1989 | Bussereau et al. | 60/477 X |
| 4,825,755 | 5/1989 | Takano | 60/477 X |
| 4,947,672 | 8/1990 | Pecora et al. | 60/482 X |

FOREIGN PATENT DOCUMENTS

| | | |
|---|---|---|
| 2061169 | 8/1990 | China . |
| 2101038 | 4/1992 | China . |
| 2107454 | 6/1992 | China . |
| 2131847 | 5/1993 | China . |
| 2155365 | 2/1994 | China . |
| 2172760 | 7/1994 | China . |
| 2194350 | 4/1995 | China . |

*Primary Examiner*—Hoang Nguyen
*Attorney, Agent, or Firm*—Burns, Doane, Swecker & Mathis LLP

[57] ABSTRACT

A control unit for hand-operated hydraulic jack comprises a control handle (1), a small hand-operated pump (2), a lifting cylinder (4), an inlet pipe and an outlet pipe, wherein the inlet pipe of said lifting cylinder (4) is connected with the small hand-operated pump (2) having a back-moving spring through a lifting oil circuit having a non-return valve (3), which the small hand-operated pump (2) is controlled by the control handle (1); said lifting oil circuit with a non-return valve (3) has an underload-accelerating oil circuit for quickly lifting the load when underloaded; and a release valve is provided on the outlet pipe of said lifting cylinder (4). This unit has the function of quickly lifting the load when underloaded, as well as increasing the force for lifting load when have loaded, and it can be operated simply and reliably.

17 Claims, 2 Drawing Sheets

CONTROL UNIT FOR HAND-OPERATED HYDRAULIC JACK

FIELD OF THE ART

This invention relates to a control device for hand-operated hydraulic apparatuses, belonging to the category of hydraulically-operated apparatus for continuous load-lifting.

BACKGROUND OF THE ART

At present, control devices for various kinds of hydraulic apparatuses have been developed, for example, Chinese Utility Models No. CN 2061169 U, entitled "A hydraulic jack with automatic speed-regulation", issued on Aug. 29, 1992; No. 2101038U, entitled "A double pump oil jack", issued on Apr. 8, 1992; No. CN2107454U, entitled "A light-load speed-up hydraulic jack", issued on Jun. 17, 1992 and No. CN 2155365Y, entitled "A hydraulic elevating gear device with speed regulation", issued on Feb. 9, 1994. Each of these prior Utility Models comprises a new structure with a set of pump, valves and oil lines added to the structure of an existing jack with a set of pump, valves and oil lines, that is, whenever a pump is added, a complete set of elements should be added to correspondingly, wherein two pumps thereof drawn a portion of oil to partially raise the lifting speed of the cylinder. Obviously, they are complex in structure and the boost speed thereof is limited during the light-load. It is difficult to reduce efficiently the wear of the elements of the device, and the cylinder needs to be restored its original position by an external force. In addition, the operating processes of the devices are complicated, disadvantageously affecting fluid channel properties and system efficiency. Take the device disclosed in Utility Model No. CN2107454U for example, during heavy-load lifting process, the large-diameter plunger piston pump may cause plenty of the reactive fluid oil to flow back to the fluid reservoir, resulting in energy loss. besides, since the large pump in the prior art references is not used also as a fluid reservoir, it needs to provide a fluid reservoir to ensure fluid supply, Thus, giving rise to a series of problems, such as heavy weight and large volume, etc.

In addition, the Chinese Utility Model No. CN 2172760Y, entitled "A hand-operated double-speed vertical hydraulic jack", issued on Jul. 27, 1994, discloses a double speed hydraulic jack having a large and a small cylinders in which the inner barrel and the large piston rod are encased as an integral unit in a sleeve. The defects in the structure are as follows: A) it is suitable only large tonnage jacks having load capacity of over 32 tons, so its scope of application is narrow; B) it is inferior in reliability because the check valve a is connected with the hydraulic-controlling check valve c in parallel; C) the control is complicated since check valve b for replenishing fluid is communicated with the main passage; D) the structures of all the control valves and a majority of fluid lines of the utility model, especially the return valve, hydraulic-controlled check valve and the like are not described in the drawing clearly, and it is difficult for the solution of the utility model to be carried out.

SUMMARY OF THE INVENTION

To overcome the disadvantages of the prior art, an object of the present invention is to provide a control device for hand-operated hydraulic apparatus in which tho fluid passages are simplified, compact in structure and the operation is easy and reliable.

Another object of the present invention is to provide a control device for hand-operated hydraulic apparatus which has light-load speed-up function and being capable of achieving heavy-load intensification.

A further object of the present invention is to provide a control device for hand-operated hydraulic apparatus which has a hydraulic closed cycling structure, wherein two operating pumps are provided, one of which a pump serves as a fluid reservoir in order to effectively reduce the number of elements and lower the cost.

To achieve the above objects, the present invention provides a control device for a hand-operated hydraulic apparatus suitable for a hydraulic closed-cycling structure comprising a control handle, a hand-operated large pump, a hand-operated small pump, a lift-gripping cylinder, check valves, a release valve and a feeding and return fluid passage; wherein the device further comprises: a feeding fluid passage in which the working chamber of the hand-operated large pump is fluid communicated with the working chamber of the hand-operated small pump in parallel through a check valve and sequentially is fluid communicated with the working chamber of the lift-gripping cylinder through a further check valve; a return fluid passage in which the working chamber of the lift-gripping cylinder is fluid communicated with the working chamber of the hand-operated large pump through a release valve; the working chamber of the hand-operated large pump serving also as the fluid reservoir; and the hand-operated large pump, the hand-operated small pump and the lift-gripping cylinder are all provided with single-action cylinders; the control handle is able either to control the hand-operated large pump and the hand-operated small pump simultaneously or to control the hand-operated small pump separately; wherein when the control handle is pressed down to speedily lift the hand-operated hydraulic apparatus, the hand-operated large pump and the hand-operated small pump are controlled by the control handle simultaneously; when the control handle is pressed down again to lift the heavy load only the hand-operated small pump is controlled by the control handle.

The present invention also provides a control device for a hand-operated hydraulic apparatus suitable for a hydraulic closed-cycling structure comprising a control handle, a hand-operated large pump, a hand-operated small pump, a lift-gripping cylinder, check valves, an accumulator, a pressure gauge and a feeding and return fluid passage, wherein due device further comprises: a first feeding fluid passage in which the working chamber of the head-end of the hand-operated large pump is fluid communicated with the working chamber of the head-end of the lift-gripping cylinder through a check valve; a second feeding fluid passage in which the working chamber of the head-end of the hand-operated large pump are fluid communicated with the working chamber of the hand-operated small pump in parallel through a check valve and sequentially is fluid communicated with the working chamber of the head-end of the lift-gripping cylinder through a further check valve; a return fluid passage in which the working chamber of the rod end of the lift-gripping cylinder is fluid communicated with the working chamber of the rod end of the hand-operated large pump through a passage; the working chamber of the hand-operated large pump serving also as the fluid reservoir; and the hand-operated large pump and the lift-gripping cylinder being provided with double-action cylinders; the control handle is able either to control the hand-operated large pump and the hand-operated small pump simultaneously or to control the hand-operated small pump separately; wherein when the control handle is pressed down to speedily lift the hand-operated hydraulic apparatus, the hand-operated large pump and the hand-operated small pump are controlled by the control handle simultaneously; when the control handle is pressed down again to lift the heavy load only the hand-operated small pump is controlled by the control handle.

The present invention further provides a control device for a hand-operated hydraulic apparatus, comprising a control handle, a hand-operated small pump, a fluid reservoir, a small cylinder, a lift-gripping cylinder, check valves, a sequence valve, directional control valves and a feeding and return fluid passage, wherein the device further comprises: a first feeding passage in which the fluid reservoir is fluid communicated with the hand-operated small pump in parallel through a check valve, and sequentially is fluid communicated with the small cylinder through a further check valve; a second feeding passage in which the passage is provided in parallel connection between the check valve and the small cylinder and through the sequence valve communicates to the lift-gripping cylinder, a third feeding passage in which the fluid reservoir is communicated with the lift-gripping cylinder through a check valve; a first return passage in which the lift-gripping cylinder is communicated with the fluid reservoir through the directional control valve positioned in the downstream of the sequence valve opened simultaneously by a knocker; a second return passage in which the small cylinder is communicated with tho fluid reservoir through the directional control valve positioned in the upstream of the sequence valve opened simultaneously by a knocker; the lift-gripping cylinder is connected with the small cylinder in tandem, and actuation of the two cylinders can be controlled by the sequence valve.

BRIEF DESCRIPTION OF ATTACHED DRAWINGS

The present invention will be further described in the following through attached drawings and embodiments.

Figure 1:
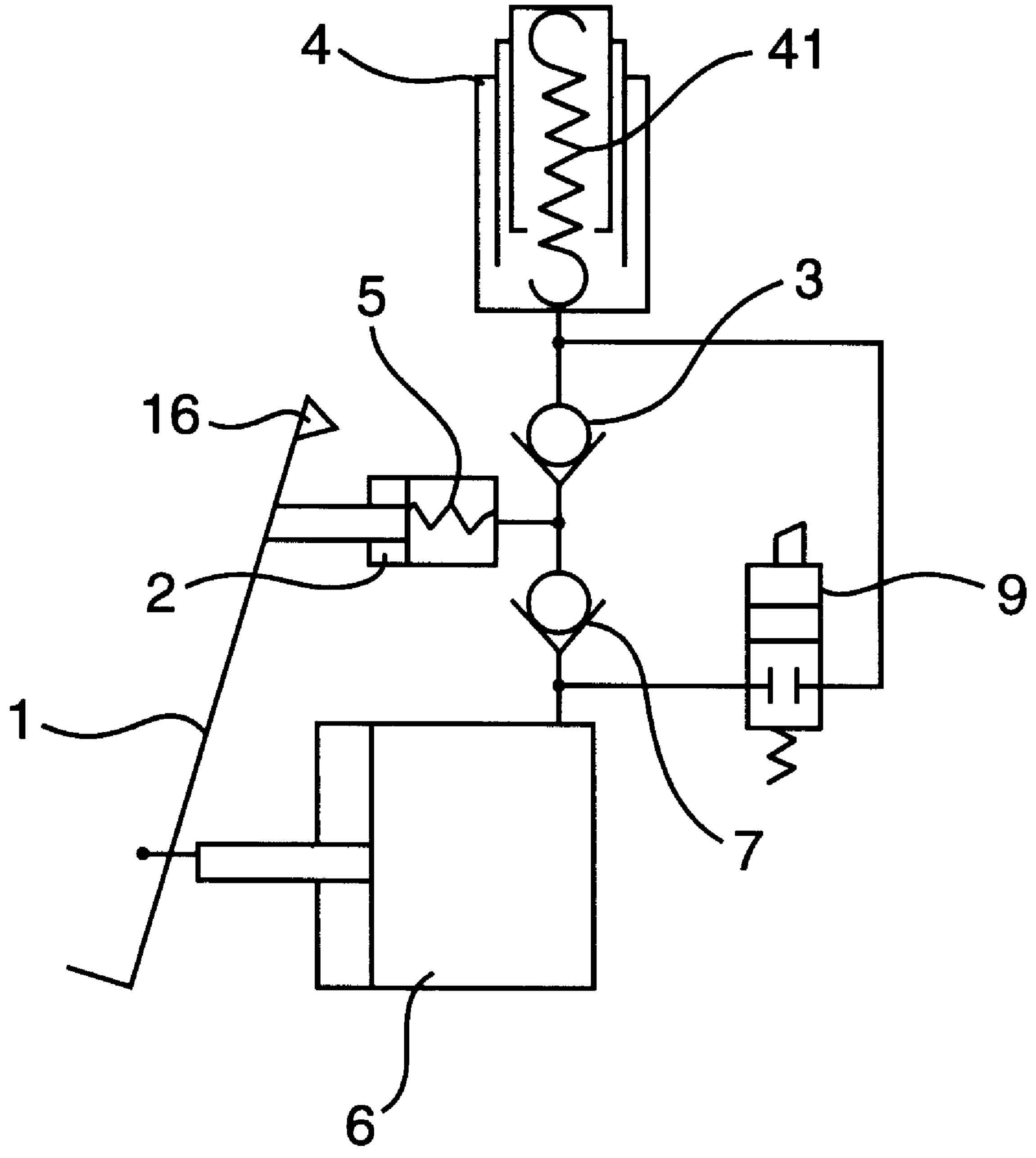
FIG. 1 is a view of the hydraulic system of an embodiment of the present invention.

Reference signs in the drawings:

1-control handle,

2-hand-operated small pump,

3,7,42-check valves,

4-lift-gripping cylinder,

5,41-restoring springs,

6-hand-operated large-pump,

8-small cylinder,

9,12-mechanical directional control valves,

10-hydraulically-controlled check valve,

11-sequence valve,

13-fluid reservoir, 14-accumulator,

15-pressure gauge,

16-knocker on the control handle.

PREFERRED EMBODIMENTS OF THE INVENTION

First Embodiment

The schematic view of the hydraulic system of the embodiment is shown in FIG. 1, wherein a small pump 2, a lift-gripping cylinder 4 and a large-pump 6 are all provided with single-action cylinders, and on the upper end of the control handle 1 there is provided a knocker 16. When the control handle 1 is pressed down, plenty of fluid flow is discharged from the large pump 6 and upon flowing through a check valve 7, converges with the fluid flow from the small pump 2 and then enters the lift-gripping cylinder 4 via a check valve 3 to cause the working end of the lift-gripping cylinder 4 to speedily approach the workpiece to be lifted and gripped. In order to extend the stroke, here a telescopic sleeve type cylinder is used as a lift-gripping cylinder, while the volume of the large pump cylinder, which serve also as a fluid reservoir, has to meet the needs for the sleeve to be entirely extended. If there is no particular requirement for the stroke of the apparatus, a conventional piston type cylinder may be employed as a lift-gripping cylinder. As soon as the working end of the lift-gripping cylinder comes into contact with the workpiece, the large pump 6 is shut off, while the control handle 1 is restored by a restoring spring 5; then the control handle 1 is pressed again, a high-pressure fluid flow is pumped out from the small pump 2 into the cylinder 4 through the check valve 3, to actuate the work end of the cylinder to effect the lift-gripping movement. During the above process, a mechanical directional control valve 9 is in a closed state and check valves 3 and 7 also close the return fluid passage of the lift-gripping cylinder 4, so the lift-gripping cylinder 4 remains stationary to keep some a pressure, if the control handle 1 is not raised. Once the control handle 1 is raised, the small pump 2 and the large pump 6 are evacuated and at the same time the knocker 16 on handle 1 opens the mechanical directional control valve 9, thereupon the fluid in the lift-gripping cylinder 4, driven by gravity, atmospheric pressure and the elastic force of the restoring spring 41, flows back to the cylinder of the large pump 6 via the mechanical directional control valve 9, causing the apparatus to restore speedily and automatically, or otherwise apparently, its restoration degree being may be controlled as desired by the control handle 1.

Second Embodiment

Figure 2:
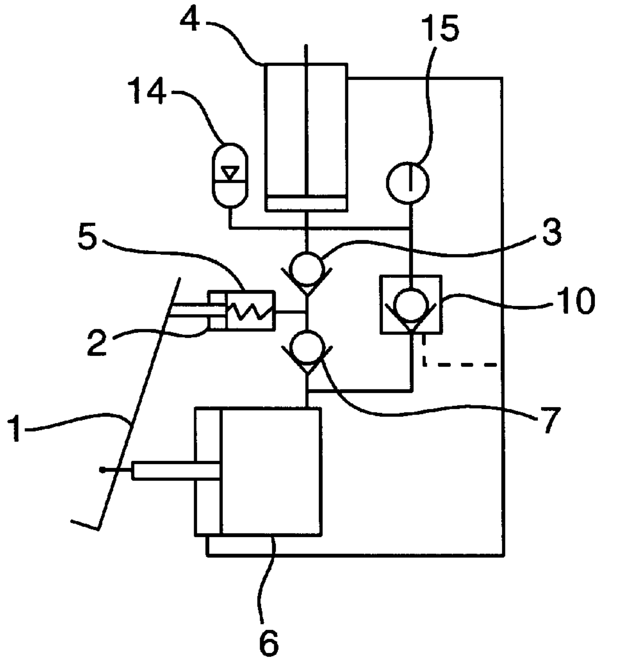
FIG. 2 is a view of the hydraulic stem of another embodiment of the present invention.
Figure 3:
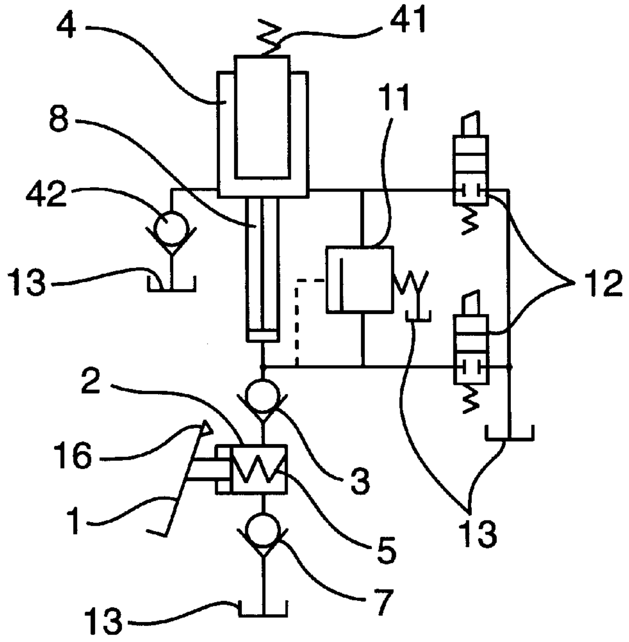
FIG. 3 is a view of the hydraulic system of a third embodiment of the present invention.

In the embodiment shown in FIG. 2, a lift-gripping cylinder 4 and a large pump 6 are both provided with double-action cylinders, but a small pump 2 is still with a single-action cylinder, for controlling implements in which restoration is difficult but accurate positioning and high reliability are required, and to this end, an accumulator 14 and a pressure gauge 15 are additionally disposed. By pressing the control handle 1 down, the rod end of the large pump 6 is evacuated, the space thereof will be supplementally filled with the fluid in the rod end of the lift-gripping cylinder 4 (via the communication passage in between); plenty of fluid flow compressed out from the head-end of the large pump 6 enters the head-end of the lift-gripping cylinder 4 through a hydraulically-controlled check valve 10, while another fluid flow converges with the fluid flow from the small pump 2 via a check valve 7 and then enters the head-end of the cylinder 4 via a check valve 3, both fluid flows drive the piston in cylinder 4 to move speedily, thus to achieve the object of the light-load speed-up. As soon as the working end of the lift-gripping cylinder 4 comes into contact with the workpiece, the large pump 6 is shut off, and the control handle 1 is restored under the influence of a spring 5; then by pressing the control handle 1 down again, the small pump 2 will pump out high pressure fluid flow to directly act on the oil plug in the lift-gripping cylinder 4, causing the apparatus to effect large tonnage movement, and at the same time, a portion of the fluid enters the accumulator 14 to accumulate energy and another portion of the fluid actuates the pressure gauge 15 to indicate the fluid pressure. The fluids in the cylinder 4, the accumulator 14 and the pressure gauge 15 have no passage to return because of the existence of check valves 3, 7 and 10, thus causing the apparatus to remain stationary to keep some a pressure. If the control handle 1 is raised, the head-end of the large pump 6 will be evacuated, and its rod end will provide the pressurized fluid to open the hydraulic check valve 10, thus opening up the return passages of the cylinder 4 and the head-end of the large pump 6, so that the fluid flow enters the rod end of the cylinder 4 via the communication passage between the cylinder 4 and the large pump 6 to push the piston to restore speedily.

Third Embodiment

In this embodiment under a lift-gripping cylinder 4 connected in tandem herewith is a small cylinder 8, both of which are driven by a hand-operated small pump 2 and their actions being controlled by a sequence valve 11. To meet the required volume of fluid amount for large tonnage and long stroke movement, a fluid reservoir 13 is still retained in the present embodiment.

When the control handle 1 is pulled, the piston in the small pump 2 is restored first by a spring 5 to draw in the fluid from the fluid reservoir 13 via a check valve 7; When the control handle 1 is pressed down, the pressurized fluid pumped out from the small pump 2 enters the small cylinder 8 via a check valve 3; since the small cylinder 8 is connected in tandem with the lift-gripping cylinder 4, the piston in the small cylinder 8 will, at a moving speed several higher times that of the piston in the small pump 2, raise the plunger in the lift-gripping cylinder 4 to approach the workpiece speedily, and at the same time, the resulted space in the lower portion of the lift-gripping cylinder 4 will be filled up by the fluid from the fluid reservoir 13 via a check valve 42, thus achieving light-load speeding-up. As soon as the working end of the lift-gripping cylinder 4 comes into contact with the workpiece, the small cylinder 8 will be shut off, the pressure in the system will rise and the sequence valve 11 operates to open the fluid inlet of the lift-gripping cylinder 4, allowing the pressurized fluid to enter simultaneously the lift-gripping cylinder 4 and the small cylinder 8, the two cylinders will jointly effect lift-gripping operations, thus to achieve the heavy-load intensification. At this moment, since the two mechanical directional control valves 12 are in a closed state, the large and small cylinders are both stationary to keep some a pressure. When restoration is needed, the control handle 1 can be raised to enable a knocker 16 thereon to knock open simultaneously two mechanical directional control valves 12, so that the fluid in the two cylinders, driven by gravity and the elastic force of the spring 41, flows back to the fluid reservoir 13, thus achieving speedy restoration.

Industrial Applicability

The present invention has been subjected to repeated verifications to make it sure that all the operations of a hydraulic apparatus can be achieved by means of the three working conditions of a handle to accomplish light-load speeding-up, heavy-load intensification and controlled restoration with sensitive and reliable control. The present invention can also meet the needs in the control of various kinds of hand-operated hydraulic apparatuses.

What is claimed is:

1. A control device for a hand-operated hydraulic apparatus suitable for a hydraulic closed-cycling structure comprising a control handle, a hand-operated large pump, a hand-operated small pump, a lift-gripping cylinder, check valves, a release valve and a feeding and return fluid passage, wherein said device further comprises:

a feeding fluid passage, in which a working chamber of said hand-operated large pump is in fluid communication with a working chamber of said hand-operated small pump in parallel through a first check valve and sequentially is in fluid communication with a working chamber of said lift-gripping cylinder through a second check valve;

a return fluid passage, in which the working chamber of said lift-gripping cylinder is in fluid communication with the working chamber of said hand-operated large pump through the release valve;

said working chamber of said hand-operated large pump serving also as a fluid reservoir;

said hand-operated large pump, said hand-operated small pump, and said lift-gripping cylinder being all provided with single-action cylinders connected in a closed-cycling system; and said control handle being able either to control said hand-operated large pump and said hand-operated small pump simultaneously or to control said hand-operated small pump separately; wherein when said control handle is pressed down to speedily lift said hand-operated hydraulic apparatus, said hand-operated large pump and said hand-operated small pump are controlled by said control handle simultaneously, and when said control handle is pressed down again to lift a heavy load, only said hand-operated small pump is controlled by said control handle.

2. The control device for a hand-operated hydraulic apparatus according to claim 1, wherein the return fluid passage of said lift-gripping cylinder is also the feeding fluid passage of said hand-operated large pump is the feeding fluid passage of said hand-operated small pump.

3. The control device for a hand-operated hydraulic apparatus according to claim 1 wherein said lift-gripping cylinder is a telescopic sleeve type cylinder.

4. The control device for a hand-operated hydraulic apparatus according to claim 1, wherein said release valve is a mechanical directional control valve.

5. The control device for a hand-operated hydraulic apparatus according to claim 1, wherein a knocker is provided on the upper end of said control handle for controlling said release valve.

6. The control device for a hand-operated hydraulic apparatus according to claim 1, wherein a restoring spring is provided in said lift-gripping cylinder.

7. The control device for a hand-operated hydraulic apparatus according to claim 1, wherein a restoring spring is provided in said hand-operated small pump.

8. A control device for a hand-operated hydraulic apparatus suitable for a hydraulic closed-cycling structure comprising a control handle, a hand-operated large pump, a hand-operated small pump, a lift-griping cylinder, check valves, an accumulator, a pressure gage and a feeding and return fluid passage, wherein said device further comprises:

a first feeding fluid passage, in which a head-end of said hand-operated large pump is in fluid communication with a working chamber of a head-end of said lift-gripping cylinder through a first check valve;

a second feeding fluid passage, in which a working chamber of a head-end of said hand-operated large pump is in fluid communication with a working chamber of said hand-operated small pump in parallel through a second check valve and sequentially is fluid communicated with the working chamber of the head-end of said lift-gripping cylinder through a third check valve;

a return fluid passage in which a working chamber of a rod end of said lift-gripping cylinder is in fluid communication with a working chamber of a rod end of said hand-operated large pump through a passage;

said working chamber of said hand-operated large pump, serving as the fluid reservoir;

said hand-operated large pump and said lift-gripping cylinder being provided with double-action cylinders; and said control handle being able either to control said hand-operated large pump and said hand-operated small pump simultaneously or to control said hand-operated small pump separately; wherein when said control handle is pressed down to speedily lift said hand-operated hydraulic apparatus, said hand-operated large pump and said hand-operated small pump are controlled by said control handle simultaneously, and when said control handle is pressed down once again to lift a heavy load, only said hand-operated small pump is controlled by said.

9. The control device for a hand-operated hydraulic apparatus according to claim 8, wherein said lift-gripping cylinder is a telescopic sleeve type cylinder.

10. The control device for a hand-operated hydraulic apparatus according to claim 8, wherein said first check valve is a hydraulic check valve.

11. The control device for a hand-operated hydraulic apparatus according to claim 8, where the fluid communication between the working chamber of the rod end of said lift-gripping cylinder and the working chamber of the rod end of said hand-operated large pump is performed by means of opening said first check valve under the pressure in said return passage.

12. The control device for a hand-operated hydraulic apparatus according to claim 8, wherein a restoring spring is provided in said hand-operated small pump.

13. The control device for a hand-operated hydraulic apparatus according to claim 8, wherein said hand-operated small pump is a single-action cylinder.

14. A control device for a hand-operated hydraulic apparatus comprising a control handle, a hand-operated small pump, a fluid reservoir, a small cylinder, a lift-gripping cylinder, check valves, a sequence valve, directional control valves and a feeding and return fluid passage, wherein said device further comprises:

a first feeding passage, in which said fluid reservoir is in fluid communication with said hand-operated small pump in parallel through a first check valve, and sequentially is in fluid communication with said small cylinder through a second check valve;

a second feeding passage, in which a passage is provided between said second check valve and said small cylinder in parallel connection and through said sequence valve communicates to said lift-gripping cylinder;

a third feeding passage, in which said fluid reservoir is in fluid communication with said lift-gripping cylinder through a third check valve;

a first return passage, in which said lift-gripping cylinder is in fluid communication with said fluid reservoir through a directional control valve positioned downstream of said sequence valve opened simultaneously by a knocker;

a second return passage, in which said small cylinder is in fluid communication with said fluid reservoir through a directional control valve positioned upstream of said sequence valve opened simultaneously by the knocker; and said lift-gripping cylinder is connected with said small cylinder in tandem, and actuations of said two cylinders are controlled by said sequence valve.

15. The control device for a hand-operated hydraulic apparatus according to claim 14, wherein the knocker is provided on the upper end of said control handle and controls simultaneously two directional control valves positioned respectively downstream and upstream of said sequence valve.

16. The control device for a hand-operated hydraulic apparatus according to claim 14, wherein said hand-operated small pump is a single-action cylinder.

17. The control device for a hand-operated hydraulic apparatus according to claim 16, further comprising a restoring spring being provided in said hand-operated small pump.

* * * * *